(12) United States Patent
Schneider et al.

(10) Patent No.: US 7,716,399 B2
(45) Date of Patent: May 11, 2010

(54) METHOD AND SYSTEM FOR DATA MANAGEMENT INTERFACE WITH INTELLIGENT PLUGINS THAT DETERMINE WHETHER TO PERFORM THE REQUESTED DATA OPERATION RECEIVED FROM AN APPLICATION

(75) Inventors: James P. Schneider, Raleigh, NC (US); Anirudha Subhash Karandikar, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 241 days.

(21) Appl. No.: 11/807,117

(22) Filed: May 25, 2007

(65) Prior Publication Data

US 2008/0294854 A1    Nov. 27, 2008

(51) Int. Cl.
 *G06F 12/00* (2006.01)
 *G06F 13/00* (2006.01)
 *G06F 9/44* (2006.01)
(52) U.S. Cl. .............. 710/62; 710/33; 710/36; 707/1; 707/10; 707/103; 707/2; 707/3; 705/1; 705/26; 711/154; 711/115

(58) Field of Classification Search ............... 710/33, 710/38, 62, 36; 707/1–3, 10, 103; 705/1, 705/26; 711/115, 154
See application file for complete search history.

(56) References Cited

U.S. PATENT DOCUMENTS 6,144,965 A * 11/2000 Oliver ..................... 707/100
6,721,733 B2    4/2004 Lipson et al.
(Continued)

OTHER PUBLICATIONS

Red Hat, Inc. "Red Hat Command Center: Users Guide 3.18", 2007, 318 pages.
(Continued)

*Primary Examiner*—Tammara Peyton
(74) *Attorney, Agent, or Firm*—Blakely, Sokoloff, Taylor & Zafman LLP

(57) ABSTRACT

A method and apparatus for managing data. A request to perform a data operation is received from an application, the request identifying data on which to perform the data operation. The request is delegated to one or more of a plurality of plugins based on the requested data operation, each of the plurality of plugins being associated with at least one distinct data operation. The one or more plugins perform the requested data operation.

22 Claims, 7 Drawing Sheets

U.S. PATENT DOCUMENTS

| | | |
|---|---|---|
| 6,847,959 B1 | 1/2005 | Arrouye et al. |
| 6,996,832 B2 * | 2/2006 | Gunduc et al. ............... 719/331 |
| 7,254,814 B1 * | 8/2007 | Cormier et al. ............. 718/106 |
| 7,509,638 B2 | 3/2009 | Backhouse et al. |
| 2002/0116453 A1 * | 8/2002 | Todorov et al. ............. 709/203 |
| 2004/0068586 A1 * | 4/2004 | Xie et al. .................... 709/246 |
| 2004/0148185 A1 * | 7/2004 | Sadiq ............................ 705/1 |
| 2005/0033794 A1 * | 2/2005 | Aridor et al. ................ 709/200 |
| 2005/0125411 A1 * | 6/2005 | Kilian et al. .................. 707/10 |
| 2006/0004689 A1 * | 1/2006 | Chandrasekaran et al. ..... 707/1 |
| 2006/0074975 A1 | 4/2006 | Tuanar et al. |
| 2008/0004887 A1 * | 1/2008 | Brunswig et al. .............. 705/1 |
| 2008/0071796 A1 * | 3/2008 | Ghuneim et al. ............. 707/10 |
| 2008/0092234 A1 * | 4/2008 | Circenis ....................... 726/21 |
| 2008/0114770 A1 * | 5/2008 | Chen et al. .................... 707/10 |
| 2008/0189651 A1 * | 8/2008 | Reveman ..................... 715/788 |
| 2008/0235710 A1 * | 9/2008 | Challenger et al. .......... 719/316 |

OTHER PUBLICATIONS

Red Hat, Inc. "Red Hat Command Center 3.18: Check Reference", 2007, 178 pages.

Red Hat, Inc. "Red Hat Command Center 3.18: Setup and Installation Guide", 2007, 33 pages.

Red Hat, Inc. "Red Hat Command Center 3.18: Release Notes", 2007, 7 pages.

* cited by examiner

METHOD AND SYSTEM FOR DATA MANAGEMENT INTERFACE WITH INTELLIGENT PLUGINS THAT DETERMINE WHETHER TO PERFORM THE REQUESTED DATA OPERATION RECEIVED FROM AN APPLICATION

TECHNICAL FIELD

Embodiments of the present invention relate to data management, and more specifically to a data management interface that includes plugins for use between applications and data storage devices.

BACKGROUND

In conventional backend data storage systems, data travels from applications to storage devices, and from storage devices to applications based on requests generated by the applications. Requests to store data are generally placed in a queue along with the data to be stored. A dequeuer reads the queue, and places the data directly into a storage device based on the request. Often, the queue cannot be read, and the data cannot be placed in appropriate data storage devices, fast enough to keep up with the requests.

When a new storage device is added to the backend data storage system, applications may require reconfiguration so that data can be stored to the new storage device. Thus, applications that generate the requests and the data may need to be modified, so that they know which storage devices to request for data to be stored in. Such modifications can be time consuming, and cause system down time.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
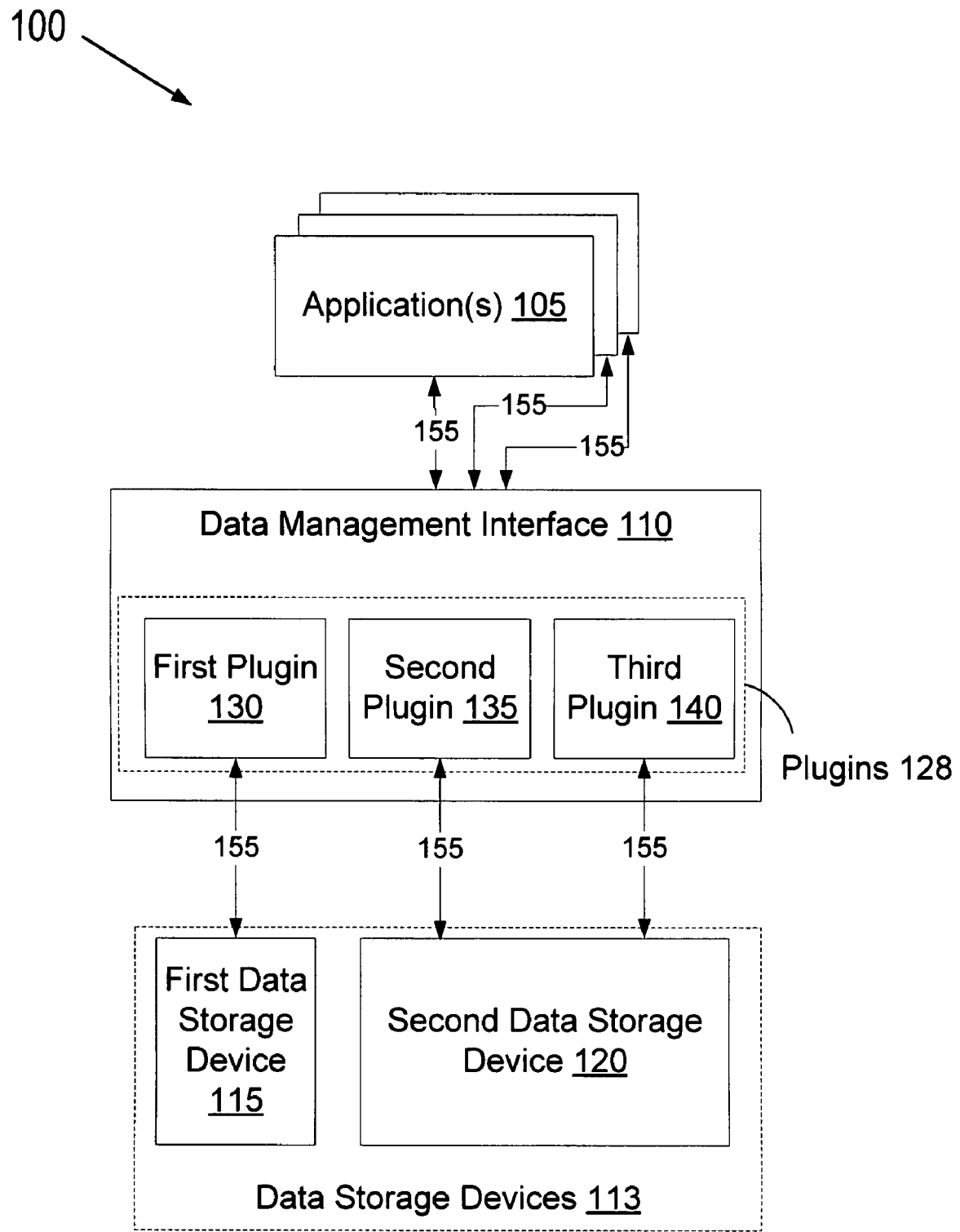
FIG. 1A illustrates an exemplary network architecture, in which embodiments of the present invention may operate.

Described herein is a method and apparatus for managing data. In one embodiment, a request to perform a data operation is received from an application. The request may identify data on which to perform the data operation. The data identification may be based on information received with the request, or on search parameters received with the request. The request is delegated to one or more of multiple plugins based on the requested data operation. Each of the multiple plugins is associated with at least one distinct data operation. The one or more plugins then perform the requested operation.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1A illustrates an exemplary network architecture 100, in which embodiments of the present invention may operate. The network architecture 100 may include one or more applications 105, a data management interface 110, and multiple data storage devices 113 (e.g., first data storage device 115 and second data storage device 120). In one embodiment, the applications 105 and data storage devices 113 are coupled with the data management interface 110 via a network 155, which may be a public network (e.g., Internet) or a private network (e.g., Ethernet or a local area Network (LAN)). Alternatively, one or more of the application 105, data management interface 110, configuration manager 150 and data storage devices 113 may be part of a single computing apparatus.

Applications 105 generate requests that identify data and an operation to perform on the data. The applications 105 may generate requests with little or no information regarding the data storage devices 113 or how the requests will be satisfied, because such information is known to the data management interface 110, which is described below. In one embodiment, applications 105 include software that employs the capabilities of a computing device or distributed computing system to generate requests associated with data stored (or to be stored) on one or more data storage devices 113. Alternatively, applications 105 may be incorporated into hardware or firmware, or may be a combination of hardware, software, and/or firmware. Applications 105 may be resident on, for example, a personal computer (PC), mobile phone, palm-sized computing device, personal digital assistant (PDA), server machine, etc. One example of an application is a monitoring application that collects information on information technology (IT) resources and sends the IT resource information to data management interface 110 for storage. Other examples of applications 105 include any database management systems (or components of database management systems) or other systems (e.g., monitoring and measurement systems) that generate non-transactional data.

Data management interface 110 is an interface between data storage devices 113 and applications 105. All requests to store data, requests to retrieve data and requests to delete data may be sent to the data management interface 110. The data management interface 110 may then determine how to satisfy the requests.

In one embodiment, the data management interface 110 is included in or provided by the applications 105. If the data management interface 110 is included in or provided by applications 105, plugins 128 (discussed below) may be loaded directly into each of the applications 105 to enable applications 105 to store data to and retrieve data from data storage devices 113. In another embodiment, data management interface 110 is external to, and separate from, applications 105. Thereby, multiple applications 105 may share a single data management interface 110. Moreover, data management interface 110 may be reconfigured without affecting applications 105, and applications may be reconfigured without affecting data management interface 110.

Data management interface 110 in one embodiment includes multiple plugins 128 (e.g., first plugin 130, second plugin 135 and third plugin 140). Data management interface 110 delegates requests received from applications 105 to plugins 128. In one embodiment, all received requests are sent to all plugins 128. In such an embodiment, a determination of whether to operate on the message may then be made by each plugin. In another embodiment, the data management interface delegates requests only to some plugins 128 (e.g., to those most suited to operate on data indicated by the request).

Plugins 128 are modules that interact with the data management interface 110 to provide data operations or other functions. Each plugin may be a stand alone application that is independent from the data management interface 110. Such independent plugins 128 may be reconfigured, added or removed without making changes to the data management interface 110. Alternatively, one or more plugins 128 may rely on data management interface 110 to provide services and functionality. To reconfigure such dependent plugins 128, it may be necessary to update the data management interface 110.

Each plugin may work with files, a relational database, a web interface, etc. For example, plugins 128 may manage legacy databases, manage read/write queue files generated between a web interface and a dequequer, interface with a relational database, operate on collections of flat files, etc. A plugin may be solely responsible for a data storage device, or multiple plugins may operate on data in the same data storage device.

Each of the plugins 128 may be responsible for performing distinct data operations. A distinct data operation may depend on the type of operation being performed (e.g., read, write, delete, etc.), or on distinct properties of data to perform the operation on (distinct data types such as text, images, audio, etc.). A plugin may be configured to perform operations (e.g., data-operations) on only a single data type, or on multiple different data types. A data type may be defined by attributes of data. Examples of attributes that may determine a data type include a timestamp, source identifiers (e.g., an application, user, client, account, etc. that generated the data), a data format (e.g., extensible markup language (XML), SOAP, comma delimited text, etc.), and so on. For example, a first data type might include all data produced between 11:00 and 12:00 by account A of a first application. A second data type might include all XML data that is produced.

Data storage devices 113 (e.g., first data storage device 115 and second data storage device 120) store data received from plugins 128. A data storage device may be a permanent store (e.g., optical media, hard disk drives, etc.), or a temporary store (e.g., volatile memory, temporary files on a disk, etc.). Thereby, data may have a permanent lifespan, or a temporary life span, depending on the data storage device on which it is stored. Examples of data storage devices 113 include relational databases, backend data stores, collections of flat files, legacy databases, etc.

In the illustrated embodiment of FIG. 1A, first data storage device 115 is managed by first plugin 130. First plugin 130 may be the only plugin configured to store data on or read data from the first data storage device 115. Accordingly, first plugin 130 may be capable of performing read operations, write operations and delete operations for data on first data storage device 115.

Also as illustrated, second plugin 135 and third plugin 140 manage second data storage device 120. Second plugin 135 may be configured to perform write operations on second data storage device 120, and third plugin 140 may be configured to perform read and delete operations on second data storage device 120. Alternatively, both second plugin 135 and third plugin 140 may be configured to perform all necessary data operations on second data storage device 120, but for different data types. For example, second plugin 135 may read, write and delete data on second data storage device 120 that is produced by a first application, and third plugin 140 may read, write and delete data on second data storage device 120 that is produced by a second application.

Figure 1B:
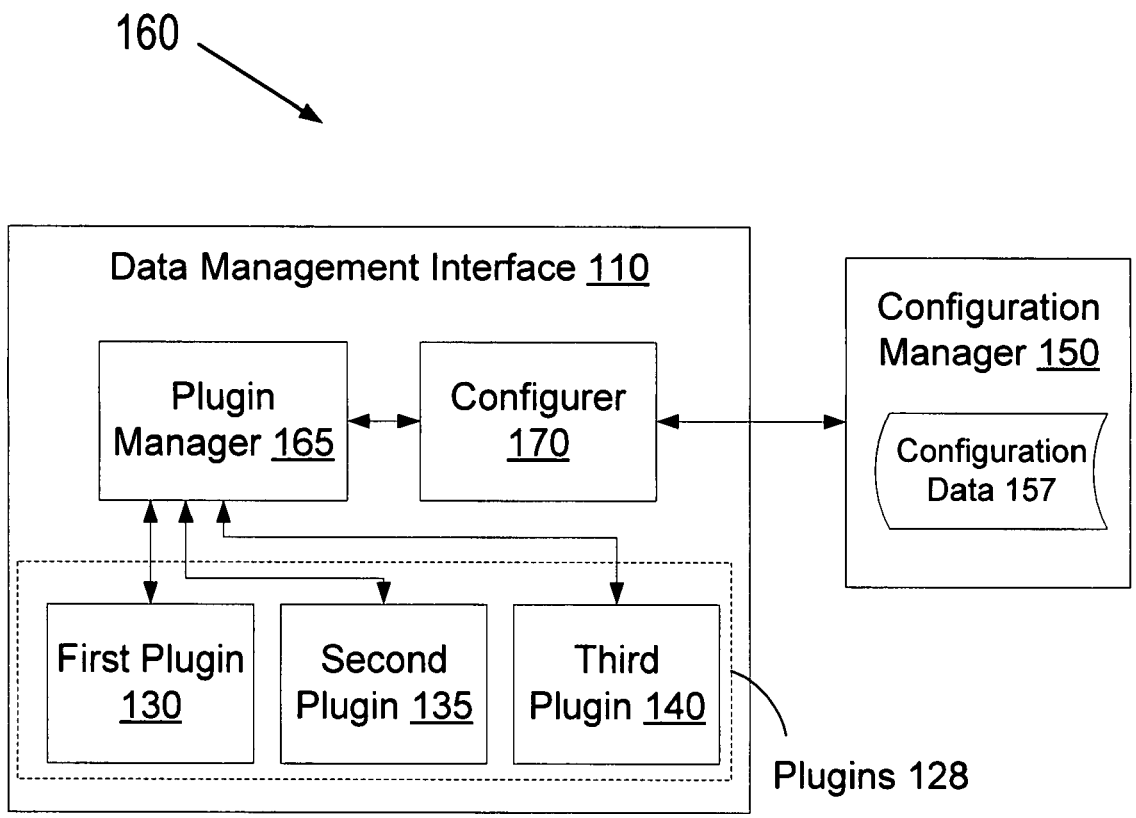
FIG. 1B illustrates a block diagram of a data management apparatus, in accordance with one embodiment of the present invention.

FIG. 1B illustrates a block diagram of a data management apparatus 160, in accordance with one embodiment of the present invention. The data management apparatus 160 may include a data management interface 110 connected with a configuration manager 150. In one embodiment, the data management interface 110 and configuration manager 150 are resident on a single computing device. Alternatively, the data management interface 110 and configuration manager 150 may be resident on separate computing devices that are networked via a public or private network.

Configuration manager 150 stores configuration data 157. Configuration data 157 includes information used to load and configure plugings 128. In one embodiment, configuration data 157 includes an explicit list of plugins to load. Alternatively, configuration data 157 may include a table of plugin entries, a tree structure, or other data structure that includes plugin entries. Configuration data 157 may also include, for example, information pertaining to which plugins are used for which operations (e.g., a list of data consumers, a list of data producers, and a list of deleters, or a table that differentiates between data consumers, data producers and deleters). Configuration data 157 may also include information that plugins require to perform operations pertaining to data storage devices, such as user ID, session ID, password, file names and/or paths to data files of plugins, etc. Configuration data 157 may also provide additional functionality (e.g., instances of a class) that individual plugins may use to perform their functions. One example of additional functionality that may be provided by the configuration manager 150 is a database connection object that plugins can use to query the database. For example, plugins that communicate with an SQL server may use an SQL database connection object provided by the configuration manager 150 to make SQL queries.

In one embodiment, data management interface 110 includes a plugin manager 165, a configurer 170, and one or more plugins 128 (e.g., first plugin 130, second plugin 135, and third plugin 140). Alternatively, more or fewer elements may be included in data management interface 110.

Configurer 170 determines which plugins to load, and gathers all information necessary to load those plugins. In one embodiment, configurer 170 communicates with configuration manager 150 to receive instructions on which plugins to load, and to receive the necessary information to load those plugins. Configurer 170 may receive, for example, configuration data 157 from configuration manager 150. In another embodiment, configurer 170 searches a local table maintained by the data management interface 110 for available plugins, and generates configuration data according to search results. In such an embodiment, configuration manager 150 may not be necessary. Once all necessary configuration data 157 is obtained, configurer 170 may format it into data structures that are usable by plugin manager 165 to load plugins 128.

Plugin manager 165 is responsible for loading plugins 128. Plugin manager 165 may load plugins 128 according to configuration data 157 obtained by configurer 170. In one embodiment, all available plugins 128 are loaded (e.g., all plugins indicated by configuration data 157). Alternatively, plugin manager 165 may apply loading criteria such that only those plugins 128 that meet the loading criteria are loaded. Loading criteria may include for example, a timestamp (e.g., only load plugins created after a specific date), version number (e.g., only load the latest version number of a plugin if multiple versions are present), etc.

Each of the plugins 128 (e.g., first plugin 130, second plugin 135, and third plugin 140) may have a common interface that enables it to be loaded by plugin manager 165. Each plugin may be configured to perform specific operations (e.g., data operations), to perform operations on data having specific properties (specific data types), and/or to communicate with specific data storage devices. Such data types, operations and data storage devices may be specified for a plugin when it is loaded. When a plugin is loaded, any plugin-specific initialization may also be performed. Examples of plugin-specific initialization include creating and/or verifying database connections, loading helper classes, directing plugin manager 165 to load or unload additional plugins, etc.

When new configuration data is obtained by configurer 170, and/or a new plugin is loaded by plugin manager 165, the data management interface 110 may be reconfigured. Reconfiguring the data management interface 110 is described in greater detail below with reference to FIG. 4. Alternatively, plugins may be added, updated, and/or removed without reconfiguring the data management interface 110. New plugins 128 may be added, for example, as new data storage devices are networked to the data management interface 110, or as plugins 128 and/or databases are updated.

In one embodiment, the data management apparatus 160 of FIG. 1B is implemented using an object oriented programming environment. In object oriented programming, a class represents an abstract data structure that provides a blueprint that specifies behaviors (methods) and state variables (fields). An object is an instance of a class that can be created (instantiated) by assigning values to the state variables. Multiple objects (instances) may be instantiated for a single class. Each object can be viewed as an independent machine or actor with a distinct role or responsibility.

Figure 2:
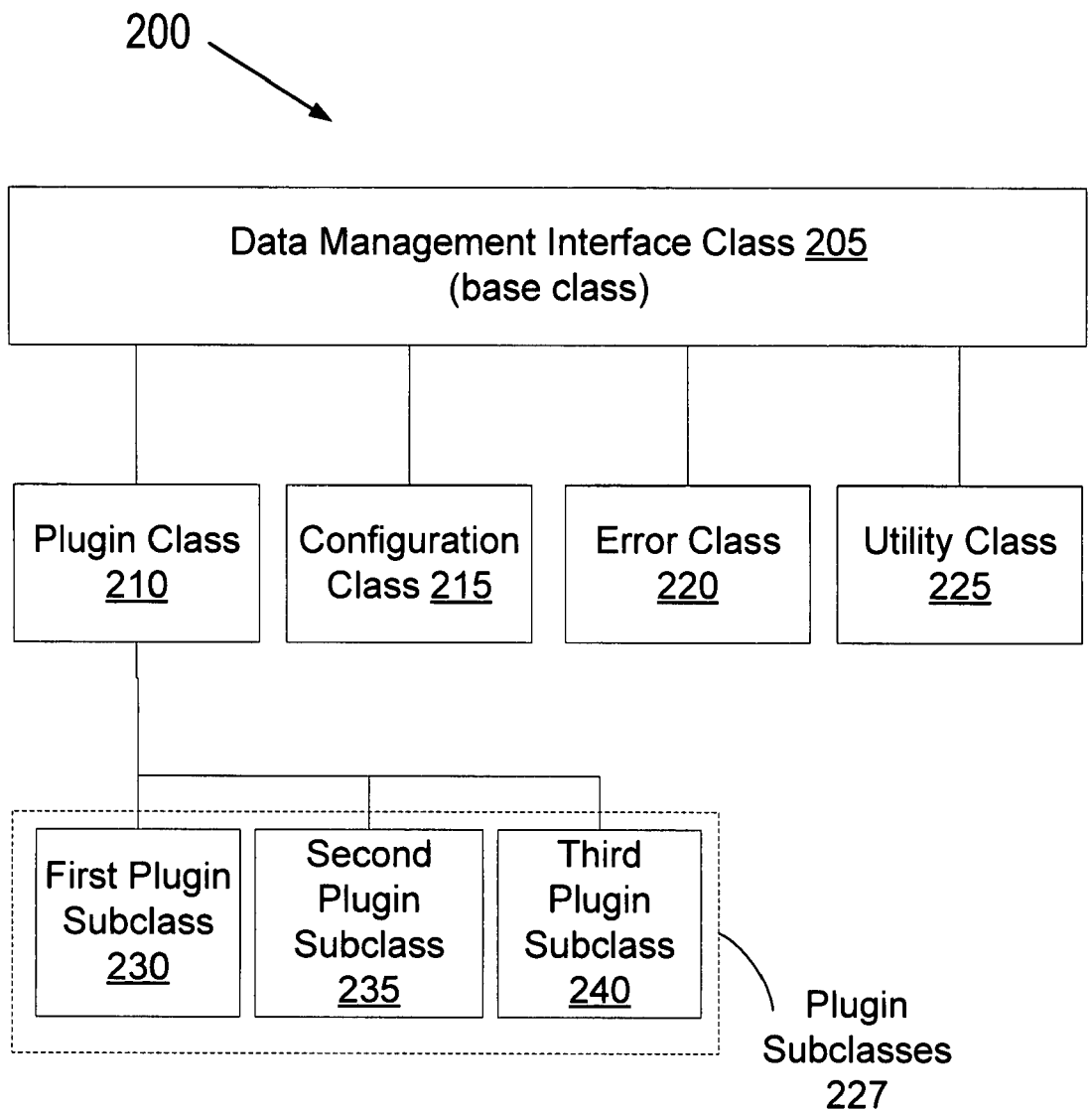
FIG. 2 illustrates a class hierarchy diagram for a data management interface, in accordance with one embodiment of the present invention.

FIG. 2 illustrates a class hierarchy 200 for a data management interface, in accordance with one embodiment of the present invention. The class hierarchy 200 may include a data management interface class 205. In one embodiment, the data management interface class 205 is a base class that all other classes in the class hierarchy may inherit from.

In one embodiment, data management interface class 205 includes a plugin class 210 and a configuration class 215. In another embodiment, the data management interface class may also include an error class 220 and/or a utility class 225. In alternative embodiments, more or fewer classes may be used.

Plugin class 210 provides a framework that plugin subclasses 227 can inherit from. Thus, the plugin class 210 may define what fields and methods plugin subclasses 227 have in common. Plugin class 210 may also provide methods that can be called on the plugin subclasses 227. For example, plugin class 210 may provide methods for reading data, for writing data, for deleting data, etc. In one embodiment, plugin class 210 is instantiated to create a plugin object corresponding to plugin manager 165 of FIG. 1B.

In one embodiment, plugin subclasses 227 (e.g., first plugin subclass 230, second plugin subclass 235 and third plugin subclass 240) are classes derived from (that inherit from) the plugin class 210. In alternative embodiments, some or all of plugin subclasses 227 may be derived directly from the data management interface class 205. Each plugin subclass includes additional components (in addition to those provided by the plugin class 210) that make that plugin subclass unique. Examples of such additional components include methods that enable writing to or reading from distinct data storage devices, methods that enable operating on data having distinct properties, etc. In one embodiment, plugin subclasses are instantiated to create plugin objects corresponding to plugins 128 of FIG. 1B.

Configuration class 215 includes fields and methods that enable configuration of plugin objects. For example, configuration class 215 may include methods for obtaining configuration data (e.g., from a configuration manager), for formatting configuration data, etc. In one embodiment, configuration class 215 is instantiated to create a configuration object corresponding to configurer 170 of FIG. 1B.

Error class 220 may be used to record and manage generated errors. Errors may be recorded along with, for example, a timestamp and a system log. Recorded errors may later be used to error check or debug a plugin.

Utility class 225 may be used for miscellaneous utility functions. Examples of utility functions include functions for creating directories, for validating that files exist, etc. When a plugin needs a utility to be performed (e.g., to create a new directory), the plugin may use the utility class for this task. Thus, redundant functionality may be reduced.

Figure 3:
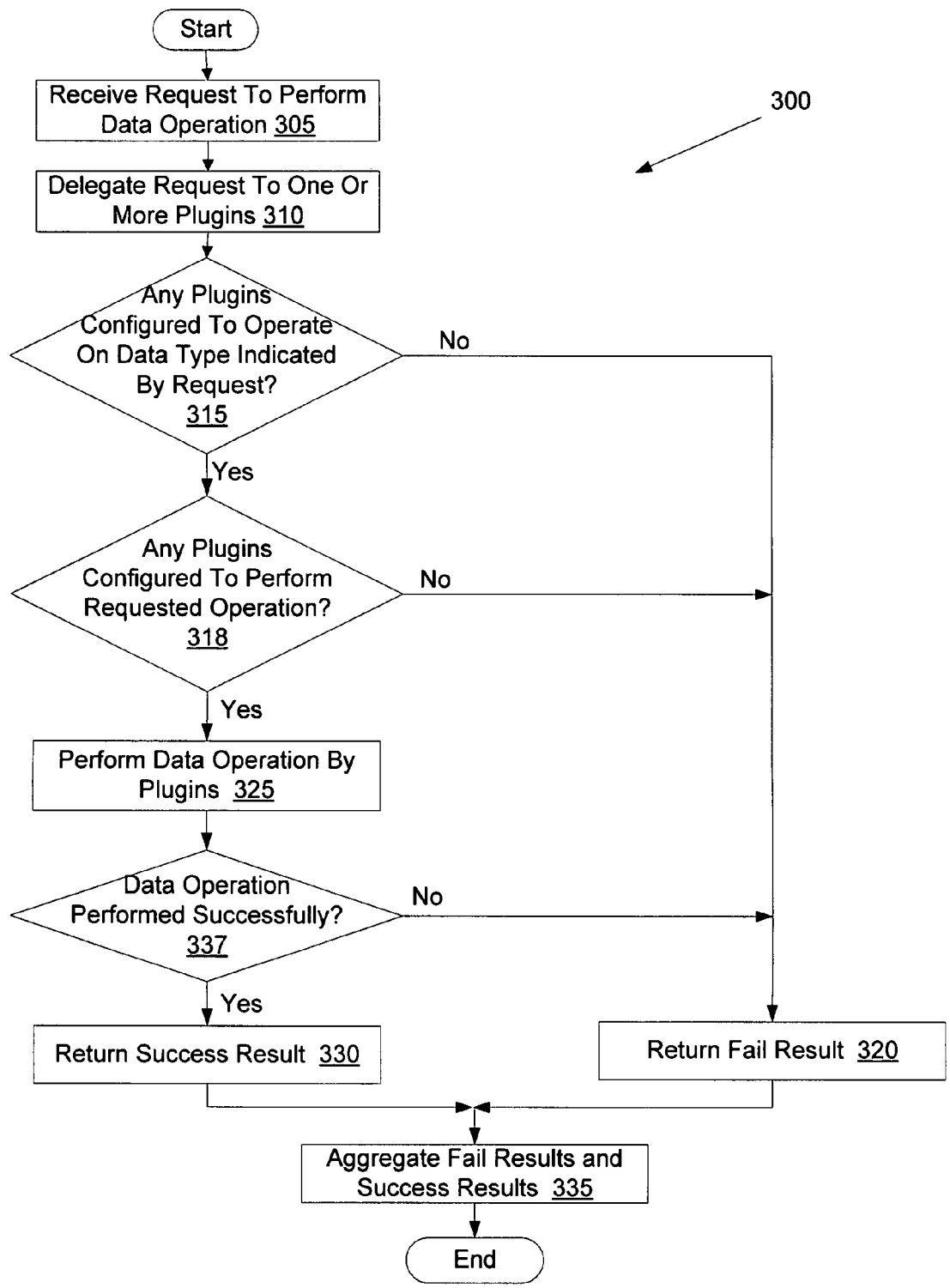
FIG. 3 illustrates a flow diagram of one embodiment for a method of managing data.

FIG. 3 illustrates a flow diagram of one embodiment for a method 300 of managing data. The method may be performed by processing logic that may comprise hardware (e.g., circuitry, dedicated logic, programmable logic, microcode, etc.), software (such as instructions run on a processing device), or a combination thereof. In one embodiment, method 300 is performed by the data management interface 110 of FIG. 1.

Referring to FIG. 3, in one embodiment, method 300 begins with processing logic receiving a request to perform a data operation (block 305). The request may identify data on which to perform the data operation. The requested data operation may be one of a produce operation, a consume operation, or a delete operation. The consume operation (also known as a write operation) writes data to a predetermined location (e.g., a data storage device). The data that is written to the predetermined location may be received along with the request. The produce operation (also known as a read operation) uses search parameters included in the request to search for data in a specific location or locations (e.g., data storage devices) to return to the requester. The delete operation uses received search parameters to search for data in a specific location or locations to delete. In one embodiment, the search parameters for both the produce operation and the delete operation include a range of data points bound by a time stamp. Alternatively, the search parameters may include one or more of a time stamp, data type, data contents, etc.

At block 310, the request is delegated to one or more plugins. Multiple plugins may operate to satisfy the request (e.g., by operating on data identified by the request) concurrently. For example, a first plugin may place data in an excel spreadsheet, while a second plugin can make the same data available to an RSS feed, and a third plugin can store the data in a data storage device.

In one embodiment, the request is sent to all loaded plugins. Each plugin receiving the request may determine whether or not to operate on the data associated with the request. Therefore, it may not be necessary for processing logic that delegates the request to have any information about the plugins other than knowledge that they are present and loaded. In another embodiment, the request is delegated to a selected plugin or plugins. To properly determine which plugins to delegate the request to, processing logic may have access to information regarding each plugin, to assess their capabilities. Therefore, for example, if the request is for a consume operation, processing logic may delegate the request to plugins capable of performing a consume operation.

In one embodiment, the plugins invoked by the data management interface are included in the data management interface. Alternatively, the plugins may be invoked directly by an application that generated the request.

At block 315, processing logic determines which plugins that have been delegated the request are configured to operate on data identified by the request. For those plugins that are not configured to operate on the identified data, the method proceeds to block 320. For those plugins that are configured to operate on the identified data, the method proceeds to block 318.

In one embodiment, each plugin determines whether it may operate on the data indicated by the request. Such a determination may be made by parsing the request to identify properties of the data (e.g., data type) and parameters of the request. If the request includes data, plugins may also parse the data to determine parameters of the data.

In one embodiment, data included in requests has an object identifier (OID), a timestamp, and a body. The OID may be analyzed to determine, for example, how to store data (e.g., what data format to store data in, where to store the data, etc.). The timestamp and/or the body of the data may also be analyzed to determine how to store the data. The OID, timestamp and data body may also be used, for example, when searching for data to delete or to read.

At block 318, processing logic determines whether any of the plugins configured to operate on the identified data are configured to perform the requested operation. A plugin may be configured to perform only a single operation, or multiple operations. For example, a first plugin may be limited to consume operations, while a second plugin may be able to perform both consume and produce operations. For those plugins that are not configured to perform the requested operation, the method proceeds to block 320. For those plugins that are configured to perform the requested operation, the method proceeds to block 325.

At block 325, the plugin or plugins perform the requested data operation. If the requested data operation was a read operation or a delete operation, then a search is performed using search parameters provided by the request to find data matching the search criteria. If the requested data operation was a write operation, then the plugin writes the data provided by the request to a storage device that the plugin is configured to write data to.

At block 327, processing logic determines whether the operation was successfully performed. If the operation was successfully performed, the method continues to block 330. If the operation was not successfully performed, the method continues to block 320.

At block 320, a plugin returns a fail result. The fail result may indicate that a plugin was not able to perform the requested operation. The fail result may also indicate that the requested operation was attempted, but was not successfully completed (e.g., when no data matching a search criteria is found for a read operation).

At block 330, a plugin returns a success result. A success is returned if the plugin successfully performs the requested operation on the data associated with the request. If the operation was a write operation, then the success result indicates that the data was successfully written. If the data operation was a delete result, then the success result indicates that the data was deleted. If the data operation was a read operation, then the success result includes the data that matches the search parameters included in the request.

At block 335, fail results and success results are aggregated. The fail results and success results may be aggregated by the data management interface. Alternatively the results may be aggregated and sent to requesting applications by a reporter, which may be a component of the data management interface. Once the results are aggregated, they may be sent to the requesting application. From the point of view of the application that generates the request, the request has been successfully performed if a single plugin returns a success result.

Figure 4:
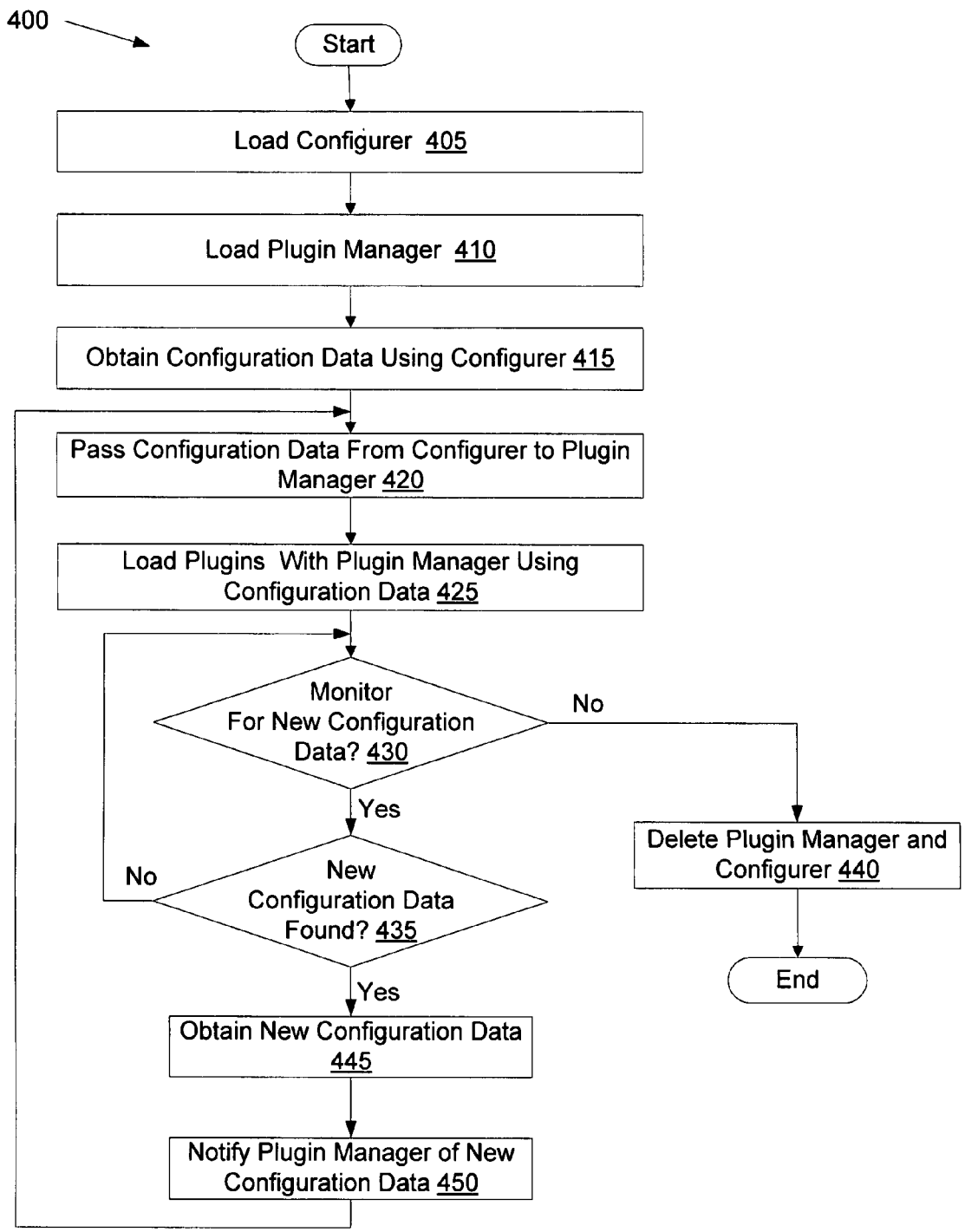
FIG. 4 illustrates a flow diagram of one embodiment for a method of configuring a data management interface.

FIG. 4 illustrates a flow diagram of one embodiment for a method 400 of configuring a data management interface. The method may be performed by processing logic that may comprise hardware (e.g., circuitry, dedicated logic, programmable logic, microcode, etc.), software (such as instructions run on a processing device), or a combination thereof. The method may be performed for initial configuration of the data management interface, or to reconfigure the data management interface. In one embodiment, method 400 is performed by the data management interface 110 of FIG. 1.

Referring to FIG. 4, method 400 begins with processing logic loading a configurer (block 405). In one embodiment, loading the configurer includes creating a configuration object of a configuration class. At block 410, a plugin manager is loaded. In one embodiment, loading the plugin manager includes creating a plugin manager object of a plugin class.

At block 415, the configurer obtains configuration data. The configuration data may be obtained from a configuration manager, which may be external to the data management interface. Alternatively, the configuration data may be gathered by the configurer based on a search of a local table maintained by the data management interface for available plugins and associated information. The configuration data includes information indicating which plugins are available to load, as well as information that is necessary to load the plugins. Some or all of this information may be represented in a table, list, tree structure, or other data structure that includes entries for plugins to be loaded. The configuration data may also include information that enables plugins to operate once they are loaded (e.g., objects and methods that can be used by plugins, necessary login IDs, session IDs, passwords, etc.). Once received, the configuration data may be formatted to data structures usable by plugins and/or by the plugin manager.

At block 420, the configuration data is passed from the configurer to the plugin manager. At block 425, the plugin manager loads plugins using the configuration data. In one embodiment, all plugins identified by the configuration data are loaded. Alternatively, the plugin manager may load only a subset of such plugins.

In one embodiment, each plugin is a plugin object of a plugin subclass. Each plugin subclass may be a subclass of the plugin class. If a plugin to be loaded is based on an existing plugin subclass (e.g., if the plugin subclass is already implemented), then loading the plugin includes creating an instance (object) of the plugin subclass by calling a load method of the plugin management object. If a plugin to be loaded will be instantiated from a new plugin subclass, then the new plugin subclass first needs to be added to the plugin class. Thereafter, plugin objects may be created using the new plugin subclass. Multiple plugin objects may be created from the same plugin subclass.

Once all plugins are loaded (e.g., plugin objects are created), the data management interface may delegate requests to perform data operations directly to some or all of the plugins as necessary. Once plugins are loaded, the plugin manager and configurer may be deleted as they may no longer be necessary for the data management interface to operate.

At block 430, processing logic determines whether to monitor for new configuration data. In one embodiment, new configuration data pertains to new plugins. Alternatively, new configuration data may provide reconfiguration information for existing plugins. If processing logic determines not to monitor for new configuration data, the method proceeds to block 440, and the plugin manager and configurer are deleted. If processing logic determines to monitor for new configuration data, the method proceeds to block 435.

At block 435, processing logic determines whether new configuration data is found. In one embodiment, the configurer (e.g., configuration object) monitors for new configuration data. If no new configuration data is found, the method returns to block 430. If new configuration data is found, the method proceeds to block 445.

At block 445, the configurer obtains the new configuration data. The new configuration data may be obtained, for example, from a configuration manager. At block 450, the configurer notifies the plugin manager that new configuration data is available. In one embodiment, the configurer notifies the plugin manager by sending a message to the plugin manager. Alternatively, the configurer provides a flag that the plugin manager may periodically check to determine whether new configuration data is available. The method then proceeds to block 420.

Figure 5:
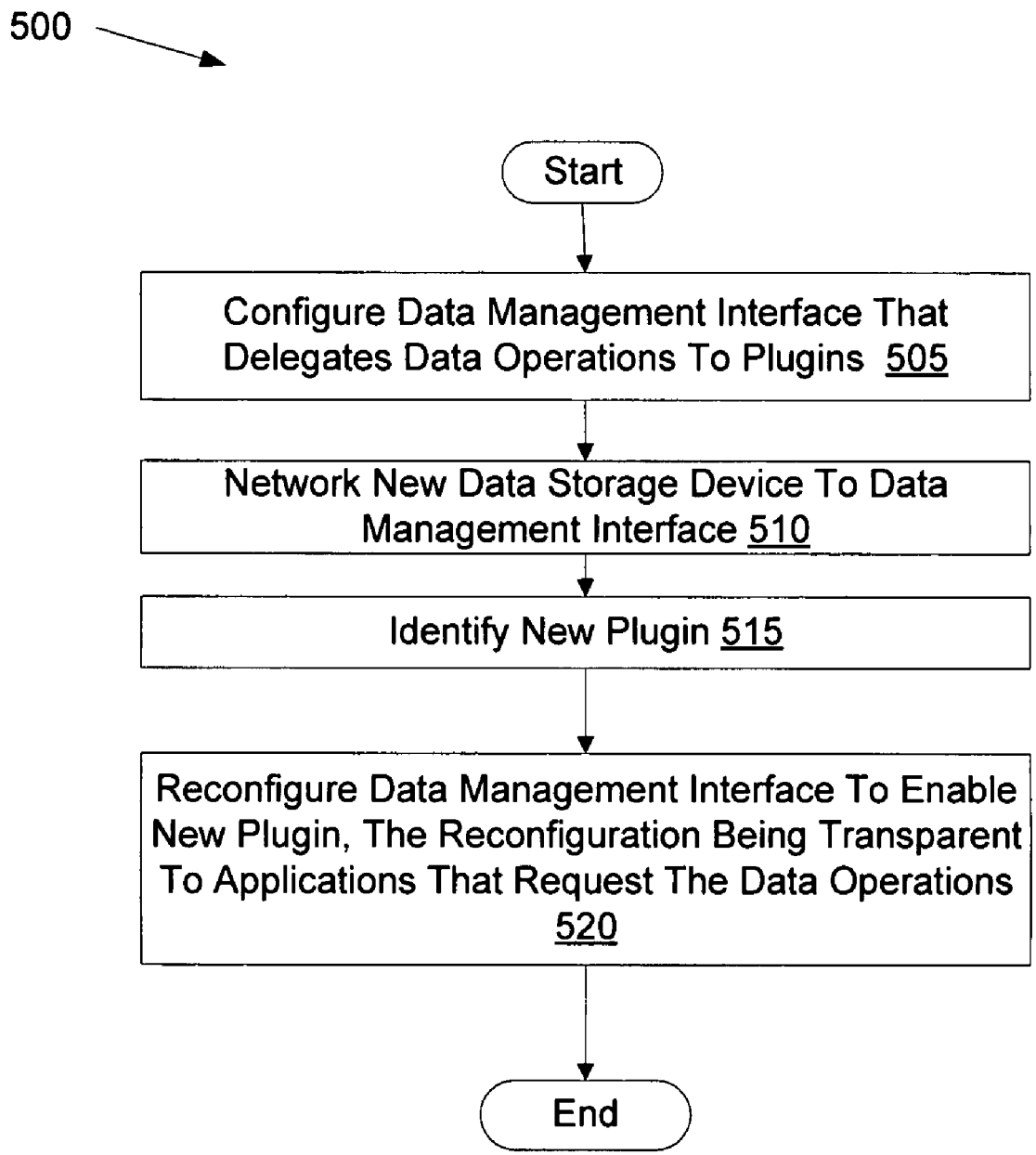
FIG. 5 illustrates a flow diagram of one embodiment for a method of adding functionality to a data management system.

FIG. 5 illustrates a flow diagram of one embodiment for a method 500 of adding functionality to a data management system. The method may be performed by processing logic that may comprise hardware (e.g., circuitry, dedicated logic, programmable logic, microcode, etc.), software (such as instructions run on a processing device), or a combination thereof. In one embodiment, method 500 is performed by the data management interface 110 of FIG. 1.

Referring to FIG. 5, method 500 begins with processing logic configuring a data management interface that delegates data operations to plugins (block 505). In one embodiment, the data management interface is configured as described in method 400 of FIG. 4.

At block 510, a new data storage device is networked to the data management interface. Alternatively, a new application may be networked to the data management interface, new data formats may be introduced to the data management interface, or some other new functionality may be added.

At block 515, a new plugin is identified. The new plugin may be identified by a configurer that monitors for a change in configuration data. The new plugin may be configured to interface with the new data storage device, to operate on data having the new data format, or to otherwise enable or make available the new functionality.

At block 520, the data management interface is reconfigured to enable the new plugin. In one embodiment, reconfiguring the data management interface includes loading the new plugin. In one embodiment, the data management interface is reconfigured as described by method 400 of FIG. 4. In one embodiment, the data management interface is reset to initiate the reconfiguration. In another embodiment, no reset is necessary.

Returning to FIG. 5, reconfiguration of the data management interface may be transparent to at least one application that requests data operations to be performed by the data management interface. Thus, the data management interface enables a scalable system that may have components (e.g., data storage devices) and functionality added simply by adding new plugins. This allows for seamless integration of additional data storage devices 113 and/or integration of additional functionality (e.g., incorporation of new data types) by changing a configuration of the data management interface 110. Such additional data storage devices 113 and/or additional functionality may be added without modifying applications 105.

Figure 6:
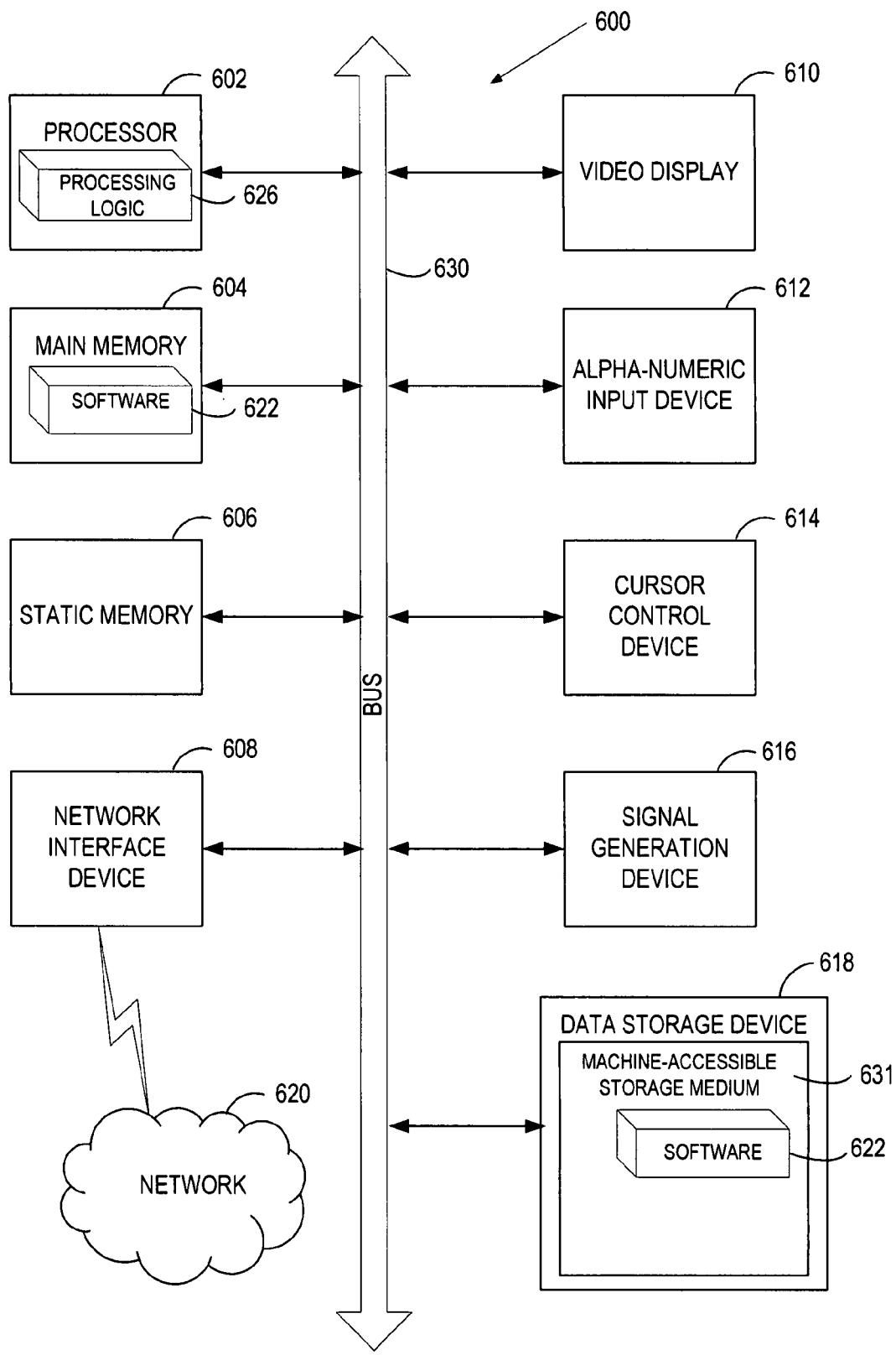
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-accessible storage media. The software 622 may further be transmitted or received over a network 620 via the network interface device 608.

The machine-accessible storage medium 631 may also be used to store data structure sets that define user identifying states and user preferences that define user profiles. Data structure sets and user profiles may also be stored in other sections of computer system 600, such as static memory 606.

While the machine-accessible storage medium 631 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for a data management interface, comprising:
receiving, by a computing device having a non-transitory storage medium, a request to perform a data operation from an application, the request identifying data on which to perform the data operation;
simultaneously delegating the request to two or more of a plurality of plugins by the computing device, each of the plurality of plugins being associated with at least one distinct data operation;
determining by a first plugin of the two or more plugins to perform the requested data operation based on contents of the request;
determining by a second plugin of the two or more plugins not to perform the requested data operation based on the contents of the request; and
performing the requested data operation by the first plugin.

2. The method of claim 1, wherein the data operation is one of a read, write, and delete operation.

3. The method of claim 1, wherein the request includes at least one of received data on which to perform the data operation, and a search parameter to locate stored data on which to perform the data operation.

4. The method of claim 3, wherein each of the one or more plugins analyzes at least one of the received data and the search parameter to determine how to perform the data operation.

5. The method of claim 1, wherein each of the one or more plugins is responsible for at least one of storing data to, retrieving data from, and deleting data on at least one data storage device.

6. The method of claim 5, wherein a data management interface is between a first application that generated the request and the at least one data storage device.

7. The method of claim 1, wherein the data management interface is provided by an application that generates the request.

8. A machine-accessible storage medium including instructions that, when executed by a machine, cause the machine to perform a method for a data management interface, comprising:

receiving a request to perform a data operation from an application, the request identifying data on which to perform the data operation;

simultaneously delegating the request to two or more of a plurality of plugins, each of the plurality of plugins being associated with at least one distinct data operation;

determining by a first plugin of the two or more plugins to perform the requested data operation based on the contents of the request;

determining by a second plugin of the two or more plugins not to perform the requested data operation based on the contents of the request; and performing the requested data operation by the first plugin.

9. The machine-accessible storage medium of claim 8, wherein the data operation is one of a read, write, and delete operation.

10. The machine-accessible storage medium of claim 8, wherein the request includes at least one of received data on which to perform the data operation, and a search parameter to locate stored data on which to perform the data operation.

11. The machine-accessible storage medium of claim 10, wherein each of the one or more plugins analyzes at least one of the received data and the search parameter to determine how to perform the data operation.

12. The machine-accessible storage medium of claim 8, wherein each of the one or more plugins is responsible for at least one of storing data to, retrieving data from, and deleting data on at least one data storage device.

13. The machine-accessible storage medium of claim 12, wherein a data management interface is between a first application that generated the request and the at least one data storage device.

14. The machine-accessible storage medium of claim 8, wherein the data management interface is provided by an application that generates the request.

15. A system, comprising:
a memory to store instructions for a data management interface and for a plurality of plugins; and
a processor, connected to the memory, to execute the instructions, wherein the instructions cause the processor to:
receive a request to perform a first data operation by the data management interface, the request identifying data on which to perform the first data operation;
delegate the request to two or more of the plurality of plugins, each of the plurality of plugins being associated with at least one distinct data operation;
determine by a first plugin of the two or more plugins to perform the requested data operation;
determine by a second plugin of the two or more plugins not to perform the requested data operation; and
perform the requested data operation by the first plugin.

16. The system of claim 15, wherein the first data operation is one of a read, write, and delete operation.

17. The system of claim 15, wherein the request includes at least one of received data on which to perform the first data operation, and a search parameter to locate stored data on which to perform the first data operation.

18. The system of claim 17, wherein each of the one or more plugins to analyze at least one of the received data and the search parameter to determine how to perform the first data operation.

19. A system, comprising:
a memory to store instructions for a data management interface and for a plurality of plugins; and
a processor, connected to the memory, to execute the instructions, wherein the instructions cause the processor to:
receive a request to perform a first data operation by the data management interface, the request identifying data on which to perform the first data operation;
simultaneously delegate the request to two or more of the plurality of plugins, each of the plurality of plugins being associated with at least one distinct data operation;
determine by a first plugin of the two or more plugins to perform the requested data operation based on the contents of the request;
determine by a second plugin of the two or more plugins not to perform the requested data operation based on the contents of the request; and
perform the requested data operation by the first plugin.

20. The system of claim 15, wherein the data management interface is provided by the application.

21. The method of claim 1, further comprising:
determining by a second plugin of the one or more plugins to perform the requested data operation; and
performing the requested data operation by the second plugin.

22. The method of claim 1, further comprising:
receiving fail results from plugins that failed to perform the requested operation;
receiving success results from plugins that succeeded in performing the request operation;
generating an aggregated report of the fail results and the success results; and
sending the aggregated report to the application, wherein the aggregated report reports a success if a success result was received from any of the plurality of plugins.

* * * * *